«12» United States Patent
Hanson et al.

(10) Patent No.: US 10,406,738 B2
(45) Date of Patent: Sep. 10, 2019

(54) DIE ASSEMBLY AND METHOD OF SETTING UP AN EXTRUSION SYSTEM UTILIZING THE DIE ASSEMBLY

(71) Applicant: Processing Technologies International, LLC, Aurora, IL (US)

(72) Inventors: Dana R. Hanson, St. Charles, IL (US); Mitchell L. Gritzner, Montgomery, IL (US); Ryan E. Leopold, Aurora, IL (US)

(73) Assignee: Processing Technologies International, LLC, Aurora, IL (US)

( * ) Notice: Subject to any disclaimer, the term of this patent is extended or adjusted under 35 U.S.C. 154(b) by 645 days.

(21) Appl. No.: 14/512,891

(22) Filed: Oct. 13, 2014

(65) Prior Publication Data
US 2016/0101552 A1   Apr. 14, 2016

(51) Int. Cl.
| | |
|---|---|
| *B29C 48/265* | (2019.01) |
| *B29C 48/25* | (2019.01) |
| *B29K 101/00* | (2006.01) |
| *B29L 7/00* | (2006.01) |
| *B29C 48/08* | (2019.01) |
| *B29C 48/69* | (2019.01) |

(52) U.S. Cl.
CPC .......... *B29C 48/265* (2019.02); *B29C 48/266* (2019.02); *B29C 48/08* (2019.02); *B29C 48/69* (2019.02); *B29K 2101/00* (2013.01); *B29L 2007/00* (2013.01)

(58) Field of Classification Search
CPC ............ B29C 47/0864; B29C 47/0866; B29C 47/0867; B29C 47/18
See application file for complete search history.

(56) References Cited

U.S. PATENT DOCUMENTS

| | | | | | |
|---|---|---|---|---|---|
| 2,450,324 | A | * | 9/1948 | Wilson | ................ B29C 47/0035 264/DIG. 40 |
| 3,619,859 | A | * | 11/1971 | Nelson | .................... B29C 47/08 425/131.1 |
| 4,354,814 | A | * | 10/1982 | Grimminger | ........... B29C 43/24 425/186 |
| 4,453,998 | A | * | 6/1984 | Cress | ..................... B29C 33/58 156/350 |
| 4,484,879 | A | * | 11/1984 | Heinz | ................... B30B 11/006 264/40.5 |

(Continued)

FOREIGN PATENT DOCUMENTS

| | | | |
|---|---|---|---|
| DE | 102010061997 A1 * | 5/2012 | |
| WO | WO-8806515 A1 * | 9/1988 | ............. B29C 47/08 |

*Primary Examiner* — Seyed Masoud Malekzadeh
*Assistant Examiner* — Manley L Cummins, IV
(74) *Attorney, Agent, or Firm* — Wood, Phillips, Katz, Clark & Mortimer

(57) ABSTRACT

A die assembly through which flowable material from a supply is controllably delivered to a processing assembly at which a sheet layer is formed. The die assembly has a main frame and a support assembly for the main frame. The support assembly includes components cooperating between the main frame and a base upon which the main frame is supported to allow controlled relative vertical movement between the main frame and base to thereby permit controlled alignment between the main frame and an upstream component that delivers flowable material from the supply to the die assembly.

25 Claims, 7 Drawing Sheets

(56) References Cited

U.S. PATENT DOCUMENTS

| | | | | |
|---|---|---|---|---|
| 5,167,894 A | * | 12/1992 | Baumgarten | B29C 43/24 264/175 |
| 5,830,391 A | * | 11/1998 | Lamkemeyer | B29C 47/0808 264/176.1 |
| 8,091,397 B1 | * | 1/2012 | Allen | B21D 17/04 72/106 |
| 2003/0115926 A1 | * | 6/2003 | Cutshall | B21D 35/00 72/404 |
| 2004/0165796 A1 | * | 8/2004 | Longhurst | F16C 23/02 384/40 |
| 2005/0212166 A1 | * | 9/2005 | Seo | B29C 70/506 264/147 |
| 2006/0076705 A1 | * | 4/2006 | Fowler | B29C 47/0004 264/211.23 |
| 2008/0305198 A1 | * | 12/2008 | Ulrich | B29C 47/0023 425/112 |
| 2009/0026653 A1 | * | 1/2009 | Kossl | B29C 47/003 264/209.5 |
| 2010/0247704 A1 | * | 9/2010 | Neubauer | B29C 47/0023 425/466 |
| 2010/0303943 A1 | * | 12/2010 | Hanson | B29C 47/0021 425/114 |
| 2010/0323049 A1 | * | 12/2010 | Langlais | B29C 47/225 425/113 |
| 2013/0328253 A1 | * | 12/2013 | Kraner | G05B 19/404 267/140.14 |
| 2013/0334730 A1 | * | 12/2013 | Maeder | B29C 47/0806 264/176.1 |

\* cited by examiner

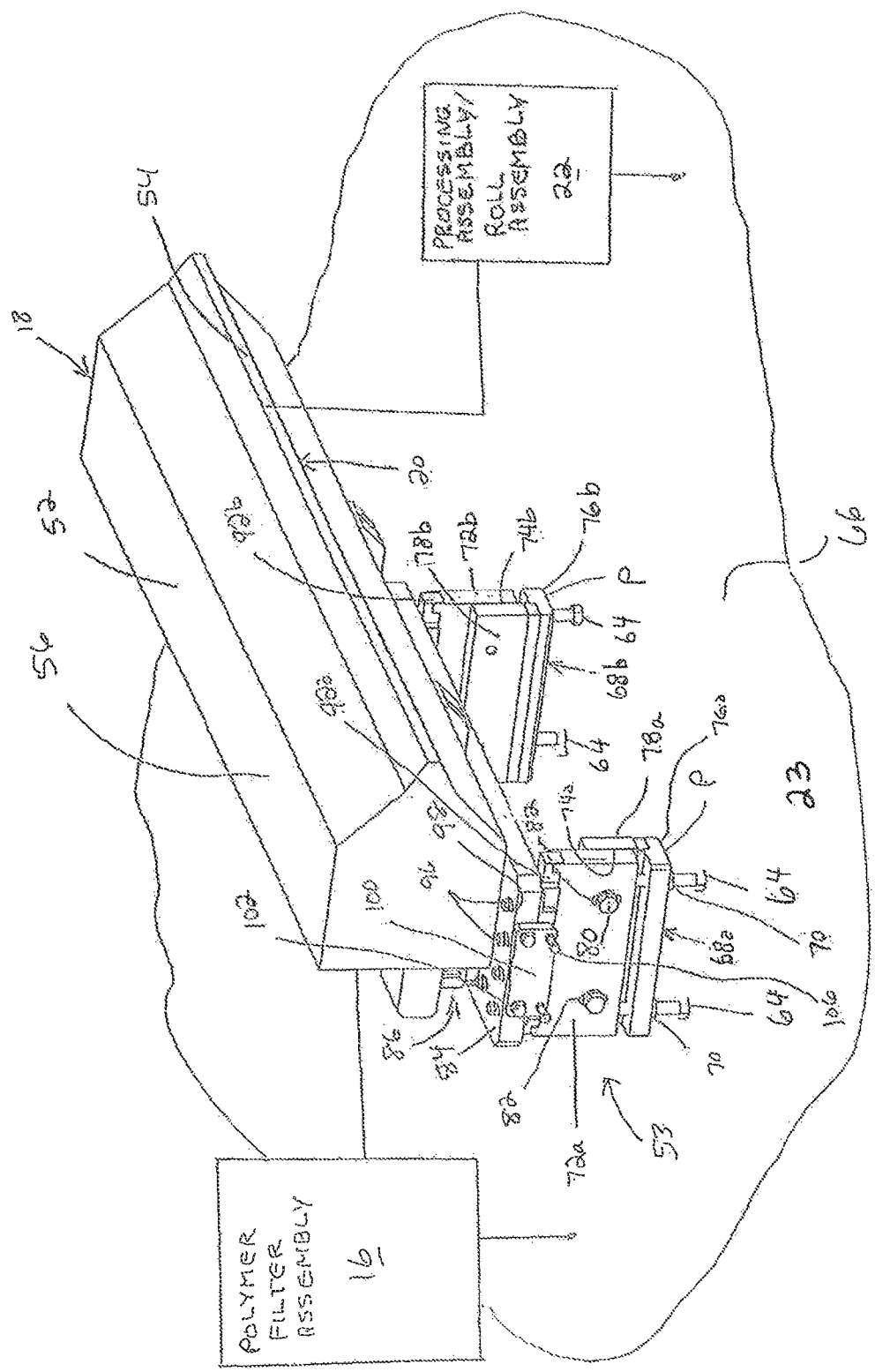

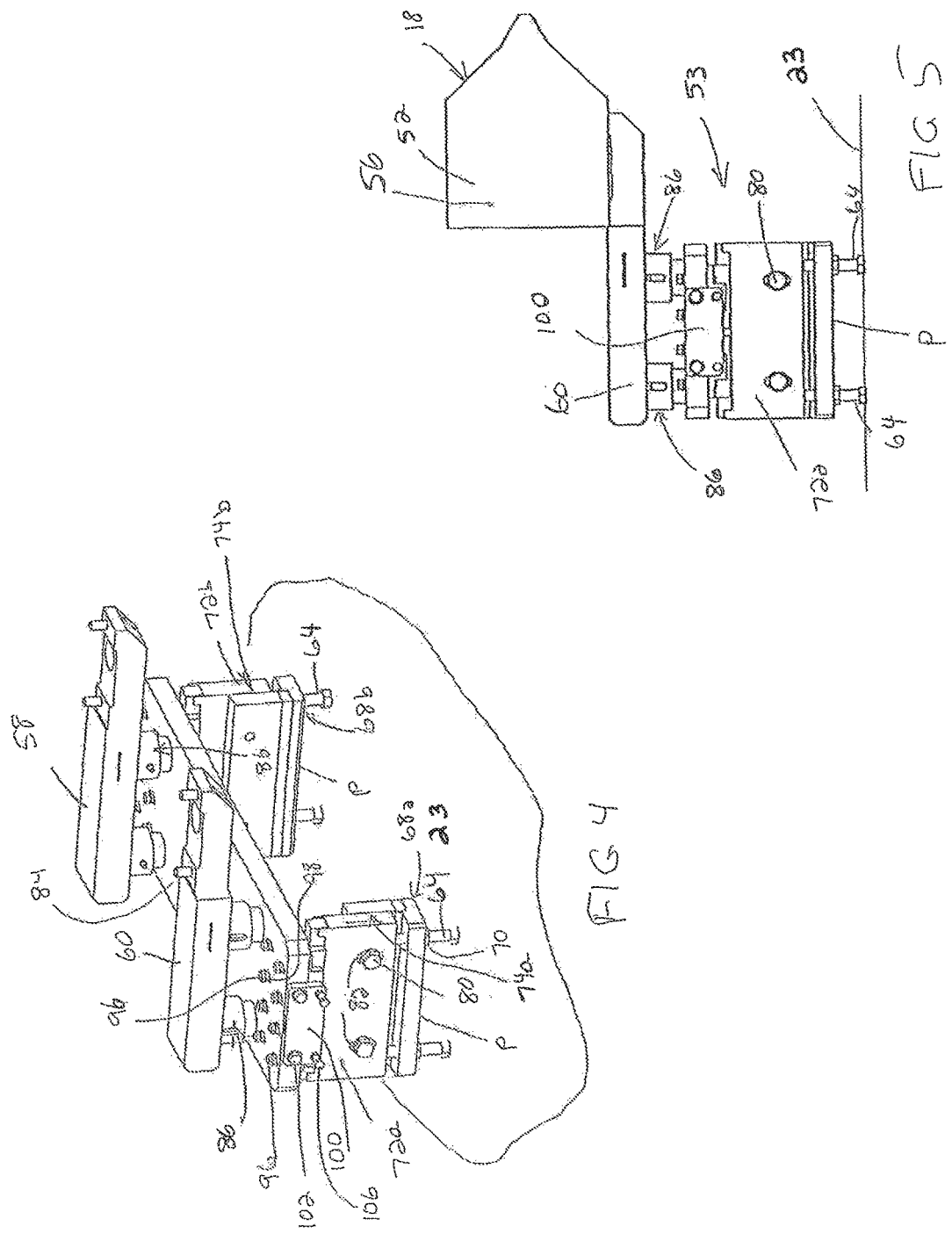

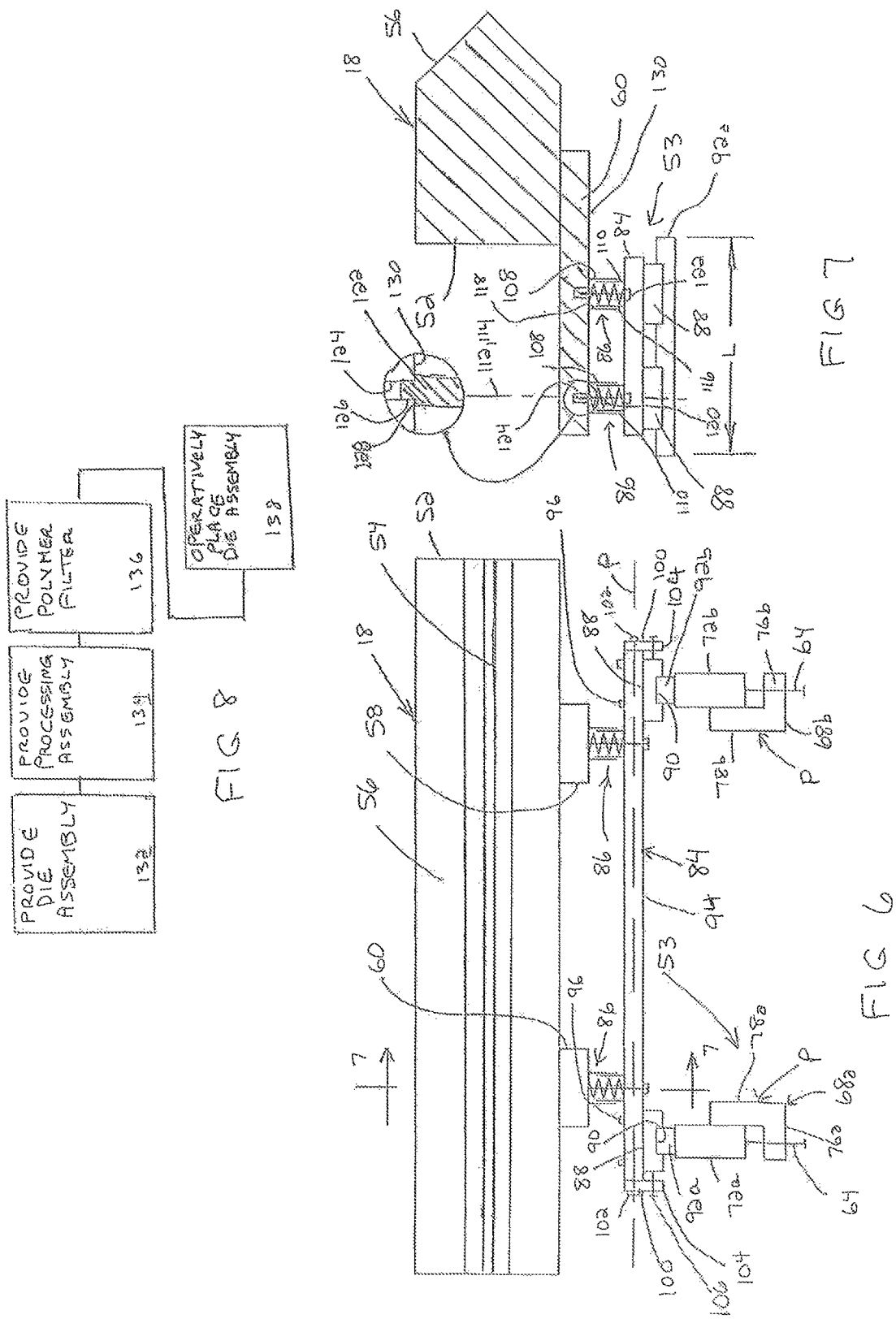

DIE ASSEMBLY AND METHOD OF SETTING UP AN EXTRUSION SYSTEM UTILIZING THE DIE ASSEMBLY

BACKGROUND OF THE INVENTION

Field of the Invention

This invention relates to extrusion systems as used to form sheets/sheet products using a supply of flowable material.

Background Art

One basic extrusion sheet forming system utilizes the combination of a barrel assembly, a polymer filter assembly, and a die assembly through which flowable material is delivered from a supply to a processing/roll assembly through which one or more sheet layers are formed. An exemplary system is shown in U.S. Pat. No. 8,021,140. Flowable material from the supply is delivered through the barrel assembly to the polymer filter assembly, within which filtering of the flowable material takes place. From the polymer filter assembly, the filtered, flowable material is directed to the die assembly which causes a controlled, precise delivery of the flowable material to a processing/roll system upon which the flowable material is solidified and formed into a sheet layer. The sheet layer may be accumulated by itself or united with one or more additional sheet layers to produce a completed product or an intermediate product that is further processed downstream, or elsewhere.

Polymer materials utilized in these systems are commonly heated to elevated temperatures that cause expansion of metal parts that must be accommodated to avoid deformation and skewing of system assemblies/components that could compromise the integrity of the sheets and products generated. Various modifications have been made to such systems in the past to minimize deformation and accommodate expansion and contraction of interacting metal parts.

For example, it is known to support the die assembly on a wheeled cart or using a metal-to-metal slide that permits a modicum of lengthwise shifting. These arrangements allow out-of-plane loads to be transmitted between components upstream and downstream of the die assembly. These systems lack the ability to maintain precise component alignment and do not support the weight of the die assembly when a misalignment naturally occurs.

The industry continues to seek designs that better accommodate thermal expansion and contraction in an efficient and practical manner.

SUMMARY OF THE INVENTION

In one form, the invention is directed to a die assembly through which flowable material from a supply is controllably delivered to a processing assembly at which a sheet layer is formed. The die assembly has a main frame and a support assembly for the main frame. The support assembly has components cooperating between the main frame and a base, upon which the main frame is supported, to allow controlled relative vertical movement between the main frame and base to thereby permit controlled alignment between the main frame and an upstream component that delivers flowable material from the supply to the die assembly.

In one form, the cooperating components include a plurality of spring assemblies that act between the main frame and base and exert an upward biasing force upon the main frame.

In one form, at least one of the spring assemblies has a first part movable vertically with the main frame and a second part that is in substantially fixed vertical relationship to the base. The first and second parts cooperate to guide vertical movement of the main frame relative to the base while confining relative horizontal movement between the main frame and base.

In one form, the first and second parts are cylindrical in shape, respectively with first and second central vertical axes. The first and second parts are aligned with the first and second axes substantially coincident and configured so that the first and second parts are movable vertically, each relative to the other, into different axially overlapping relationship as an incident of the main frame moving vertically relative to the base.

In one form, the at least one spring assembly has a vertical biasing component.

In one form, the at least one spring assembly further includes a vertical biasing component that resides within a space bounded by one of the first and second parts.

In one form, the vertical biasing component is in the form of a coil spring.

In one form, the die assembly has an inlet end and an outlet end spaced along a flow path for the flowable material. The support assembly further includes components cooperating between the main frame and base to allow controlled relative horizontal movement between the main frame and base to thereby permit controlled alignment between the main frame and an upstream component.

In one form, the support assembly further includes a platform assembly upon which the main frame bears. The cooperating components that allow controlled relative horizontal movement between the main frame and base include at least one rail on one of the platform assembly and base and a first slot on the other of the platform assembly and base. The one rail and first slot are configured so that the one rail and first slot cooperate to guide movement of the main frame relative to the base in a substantially first linear path that is generally aligned with the flow path.

In one form, the cooperating components that allow controlled relative horizontal movement between the main frame and base further include another rail and a second slot. The another rail and second slot are provided one each on the platform assembly and base and configured so that the another rail and second slot cooperate to guide movement of the main frame relative to the base in a substantially second linear path that is substantially parallel to the first linear path.

In one form, the cooperating components that allow controlled relative vertical movement between the main frame and base include a plurality of spring assemblies that act between the platform assembly and main frame and exert an upward biasing force upon the main frame.

In one form, the plurality of spring assemblies are configured and cooperate between the main frame and base to allow the main frame to be vertically angularly reoriented relative to the base.

In one form, the polymer filter assembly further includes an adjusting assembly through which the main frame can be shifted relative to the base in a direction transversely to the first linear path.

In one form, through the adjusting assembly, the main frame is shifted relative to the base in the direction transversely to the first linear path by changing a position of the one rail in the first slot in the direction transversely to the first linear path.

In one form, the die assembly further includes an adjusting assembly through which a vertical angular orientation of the one rail relative to the base is changed.

In one form, the die assembly further includes a height adjustment mechanism through which downward movement of the main frame relative to the base is blocked with the main frame at a plurality of different selectable heights relative to the base.

In one form, the die assembly is provided in combination with an upstream component. The main frame is guidingly movable relative to the upstream component through the support assembly.

In one form, the upstream component is a polymer filter assembly.

In one form, the platform assembly includes a flat plate with a central plane that is horizontally oriented. The one rail and first slot and another rail and second slot cooperate between the flat plate and the base.

In one form, the support assembly includes components cooperating between the main frame and a portion of the base that is above the main frame.

In one form, the die assembly is provided in combination with a processing assembly.

In one form, the die assembly is configured with a horizontal delivery orientation.

In one form, the die assembly is configured with a vertical delivery orientation.

In one form, the die assembly is configured with an angled orientation.

In one form, the invention is directed to a method of setting up an extruding system. The method includes the steps of: providing the combination described above; providing a processing assembly configured to form a sheet layer with the flowable material; and operatively placing the die assembly in relationship to each of the polymer filter assembly and processing assembly so that: a) flowable material from the polymer filter assembly can be delivered to the processing assembly through the die assembly; and b) the main frame can move relative to the polymer filter assembly through the support assembly to at least one of: i) allow manual alignment between the polymer filter assembly and the die assembly; and ii) accommodate thermal expansion and contraction of the die assembly and polymer filter assembly.

BRIEF DESCRIPTION OF THE DRAWINGS

FIG. 3 is a partially schematic, perspective view of one preferred form of die assembly, according to the invention, as shown in FIG. 2, in association with a polymer filter assembly and processing assembly/roll assembly;

FIG. 4 is a view of the die assembly as in FIG. 3 with a part of a frame on the die assembly removed;

FIG. 5 is a side elevation of the die assembly in FIG. 3;

FIG. 6 is a front elevation view of the die assembly in FIGS. 3 and 5;

FIG. 7 is a cross-sectional view of the die assembly taken along the line 7-7 of FIG. 6;

FIG. 8 is a flow diagram representation of a method of setting up an extruding system utilizing the die assembly according to the invention.

DETAILED DESCRIPTION OF THE PREFERRED EMBODIMENT

Figure 1:
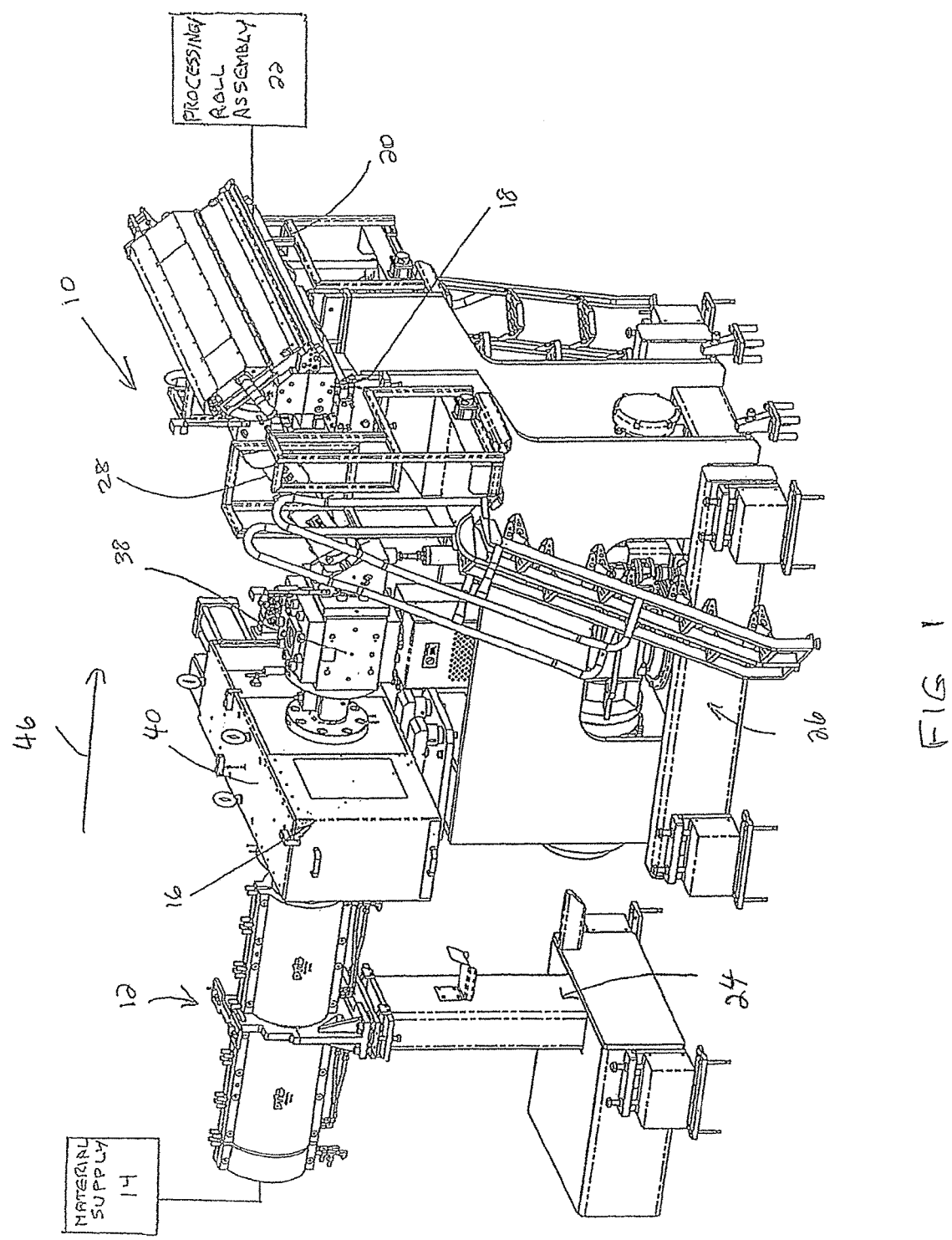
FIG. 1 is a perspective view of one form of extruding system with a die assembly, according to the present invention, incorporated therein to cooperate with an upstream polymer filter and a downstream processing/roll assembly.

In FIG. 1, an extruding system is shown at 10 for forming sheet layers/products. A barrel assembly 12 delivers flowable material, such as a polymer, from a supply 14 thereof, to a polymer filter assembly 16. The filtered material is separated for further processing with the remainder of the polymer staged for recycling. The filtered material is delivered from the polymer filter assembly 16 to a die assembly 18, made according to the present invention. The flowable material exits from the die assembly 18 at a discharge location 20 at which the flowable material is strategically applied upon a structure with one or more rolls, generically identified in FIG. 1 as a processing/roll assembly 22.

The precise nature of the processing/roll assembly 22 and the particular sheet/sheet product formed thereby are not critical to the present invention, as virtually an unlimited number of different designs, for different product manufacturing processes, are available. As examples, the processing/roll assembly 22 may be a horizontal roll stand, J-stack arranged roll stand, vertically arranged roll stand, etc. Sheet formation is described generally in U.S. Pat. No. 8,021,140, the disclosure of which is incorporated herein by reference.

Typically, the barrel assembly 12, polymer filter 16, and die assembly 18 are separately formed sub-assemblies that are operatively connected at an extrusion site. These components are typically supported on an underlying base 23. Alternatively, one or more of these components can be supported through an overhead extension of the base 23.

In this embodiment, the barrel assembly 12 is mounted in an elevated position over the base 23 upon a frame assembly 24. The polymer filter assembly 16 and die assembly 18 are mounted in an elevated position above the base 23 upon a separate frame assembly at 26. For purposes of this disclosure, the "base" will consist of all rigid mounting structure, including underlying and overhead, relative to which the barrel assembly 12, polymer filter assembly 16, and die assembly 18 are mounted to be maintained in operative relationship.

Figure 2:
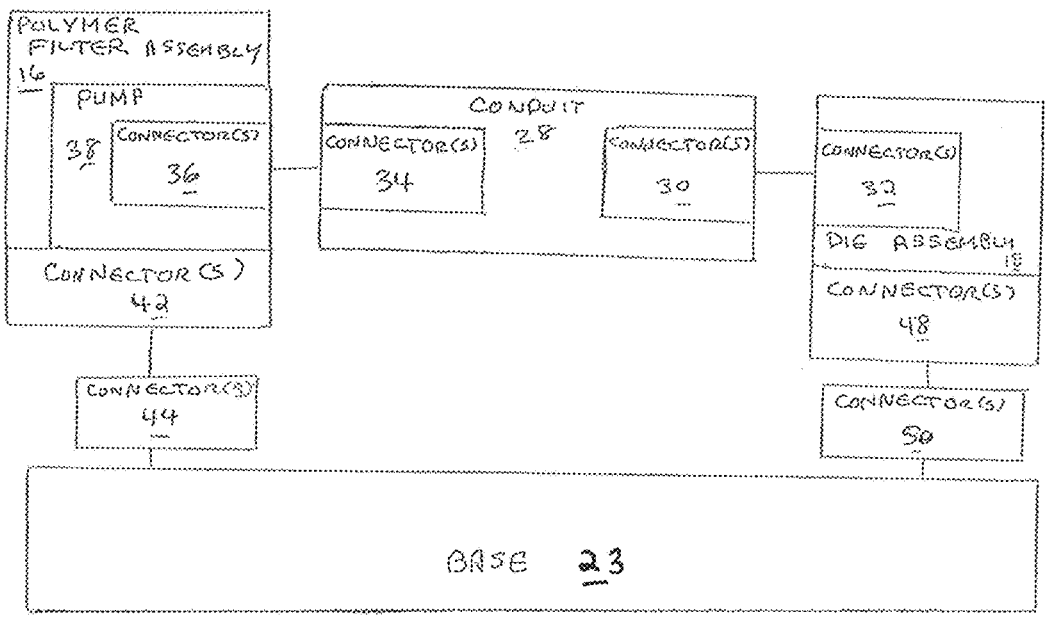
FIG. 2 is a schematic representation of an extruding system, according to the invention, and including components in the system in FIG. 1.

In FIG. 2, there is a schematic representation of the polymer filter assembly 16 in relationship to the die assembly 18. A conduit 28, as seen also in FIG. 1, communicates filtered polymer to the die assembly 18. The conduit 28 may have a horizontal/in-line configuration or a "gooseneck" configuration, as hereinafter described. The flow direction for the conduit 28 may be horizontal or inclined, as also described hereinbelow.

For purposes of simplicity, the conduit 28 can be considered to be part of either the polymer filter assembly 16 or the die assembly 18. If the conduit 28 is fixed to the polymer filter assembly 16, the invention is focused on maintaining proper alignment between cooperating connectors 30, 32, respectively on the downstream end of the conduit 28 and the die assembly 18. If the conduit 28 is fixedly connected to the die assembly 18, the invention is focused on maintaining alignment between cooperating connectors 34, 36 respectively on the upstream end of the conduit 28 and the polymer filter assembly 16.

The filtered polymer is directed through the conduit 28 by a pump 38, shown in FIG. 1 as a component spaced from a main housing 40 on the polymer filter assembly 16. In actuality, the connection between the conduit 28 and polymer filter assembly 16 occurs at the pump 38. Again, for purposes of simplicity, the pump 38 will be considered to be an integral part of a unitary polymer filter assembly 16.

As seen in FIG. 2, the polymer filter assembly 16 has at least one additional connector 42 that cooperates with at least one connector 44 associated with the base 23. The connectors 42, 44 may be configured to fix the polymer filter assembly 16 relative to the base 23. Alternatively, the connectors 42, 44 may be configured to cooperate so that the polymer filter assembly 16 is movable vertically relative to the base 23 and/or translationally along a line indicated by the arrow 46 in FIG. 1, that generally represents the polymer flow direction through the entire length of the system 10 between the barrel assembly 12 and discharge location 20 on the die assembly 18.

As explained in greater detail below, the die assembly 18 has at least one connector 48 that cooperates with at least one connector 50 associated with the base 23 to maintain the die assembly 18 in its operative position in a manner contemplated by the invention. The generic showing in FIG. 2 is intended to encompass connector configurations wherein the die assembly 18 is controllably movable at least in a vertical direction under a bias force. Alternatively, and preferably additionally, the die assembly 18 is guided controllably in a translational path by the connectors 48, 50 substantially parallel to the primary material flow path, as indicated by the arrow 46 in FIG. 1. Preferably, controlled, multi-dimensional movement of the die assembly 18 relative to the base 23 and polymer filter assembly 16 is contemplated to effectively allow precision alignment between the die assembly 18, the polymer filter assembly 16, and the processing assembly/roll assembly 22 and accommodate misalignments that may be caused by manufacturing variances, field conditions, and/or thermal dimensional variations.

Referring now to FIGS. 3-7, details of one preferred form of die assembly 18, according to the present invention, are described.

The die assembly 18 consists of a main frame 52 that is conventionally configured to distribute incoming polymer from the filter assembly 16 to across the transverse dimension of a discharge opening 54 at the discharge location 20. The main frame 18 has upstream and downstream ends. The die assembly frame 52 consists of a main frame part 56 that is fixedly secured to underlying mounting frame parts 58, 60. It is not necessary to describe any further details of the frame construction to understand the present invention.

The frame 52 is maintained in its operative position relative to the base 23 by a support assembly 53. The support assembly 53 consists of a two-part pedestal P that may be considered part of the base 23. The pedestal parts have the same construction, with corresponding parts identified with the same number and distinguished by an "a" or "b" designation. The pedestal P has a number of depending levelling feet 64 that bear upon an upwardly facing base surface 66. The levelling feet 64 have a conventional construction— each being threaded into spaced, L-shaped pedestal walls 68a, 68b and fixed vertically through a locking nut 70. By adjusting the levelling feet 64, the parts of the pedestal P can cooperatively stably support the frame 52 upon the surface 66, even when the surface 66 has contours causing a deviation from a level, planar shape.

The levelling feet 64 can also be used as part of an adjusting mechanism to change vertical and angular relationships between the die assembly frame 52 and the cooperating polymer filter assembly 16 and/or processing assembly/roll assembly 22. By providing independent pairs of levelling feet 64 on each wall 68a, 68b, multi-dimensional reorientation of the die assembly frame 62 relative to the base surface 66 can be effected.

The support assembly 53 includes side plates 72a, 72b that nest within regions 74a, 74b bounded by horizontal legs 76a, 76b and vertical legs 78a, 78b cooperatively making up the "L" shape of the pedestal parts. The levelling feet 64 are threaded into the horizontal legs 76a, 76b.

The side plates 72a, 72b are secured by fasteners 80 to their respective vertical legs 78a, 78b. As seen in FIG. 3 for exemplary wall 68a, the side plate 72a has through openings 82 that are elongate vertically whereby the fasteners 80 can be tightened to maintain the side plate 72a in different, selected relationships with the vertical leg 78a within a range dictated by the height of the openings 82. With this arrangement, the side plate 72a can be moved vertically relative to the vertical leg 78a and adjusted angularly with respect thereto within a single vertical plane.

The levelling feet 64 may be configured to cooperate with the side plates 72a, 72b, by bearing thereagainst, to provide additional vertical support therefor at different vertical heights and in different angular orientations. Alternatively, the levelling feet 64 may operate independently of the side plates 72a, 72b.

A series of components, in addition to the plates 72a, 72b, cooperate directly and indirectly between the mounting frame parts 58, 60 and the pedestal walls 68a, 68b. The plates 72a, 72b, and these additional components, as described below, are intended to correspond generally to the components/connectors 48, 50 described schematically in FIG. 2.

The frame 52 bears upon a platform assembly 84 through a series of like spring assemblies 86. The platform assembly 84 has a plurality, in this case four, like linear bearings 88 bolted thereto in a depending fashion. Two bearings 88 are associated with each of the side plates 72a, 72b.

More specifically, each bearing 88 defines a downwardly opening slot 90. The bearings 88 are constructed as linear bearings and engage laterally spaced rails 92a, 92b, respectively associated with the side plates 72a, 72b. The rails 92a, 92b have the same construction.

The bearings 88 also have the same construction. The rails 92a, 92b are oriented in parallel relationship so that their lengths L are substantially the same, parallel, and substantially aligned with the line of the flow path, as indicated by the arrow 46 in FIG. 1. By independently adjusting the height and angle of each of the side plates 72a, 72b, the heights and angles of the rails 92a, 92b can be independently changed as required to establish a desired alignment relative to the base 23.

The bearings 88 are secured to an underside surface 94 of the platform assembly 84. Threaded fasteners 96 are directed downwardly through openings 98 formed through the platform assembly 84. Four fasteners 96 are utilized to secure each bearing 88. The openings 98 are elongate in a lateral direction, i.e., normal to the flow path direction, thereby to allow the bearings 88 to be shifted horizontally primarily in a direction normal to the flow path direction to thereby align the slots 90 and rails 92a, 92b. A modicum of angular adjustment within the horizontal plane is also permitted by the arrangement of four fasteners 96 and openings 98 for each bearing 88.

Adjustment plates 100 of like construction are provided at each side of the platform assembly 84. Each adjustment plate 100 depends to below the surface 94 on the platform assembly 84. Each adjustment plate 100 is fixed to the platform assembly 84 through fasteners 102. A lower region 104 of each adjustment plate 100 vertically coincides with the bearings 88 and threadably accepts a pair of adjusting bolts 106 which can be selectively advanced and retracted in a lateral direction to controllably engage the bearings 88 to thereby change, and reinforce, a lateral position of the associated bearing 88.

The spring assemblies 86 each makes up a cooperating component arrangement acting between the die assembly 18/frame 52 and base 22 by exerting an upward supporting and biasing force upon the frame 52 so that the mass of the frame 52 is supported entirely by the spring assemblies 86. Each of the spring assemblies 86 has the same construction. However, this is not a requirement.

In the depicted embodiment, there are two spring assemblies 86 associated with each mounting frame part 58, 60, with the spring assemblies 86 on each mounting frame part 58, 60 spaced to reside adjacent the opposite lengthwise ends thereof.

Each spring assembly 86 consists of a first part 108 that is fixed to move with the frame 52. A second part 110 is mounted to the platform assembly 84 to thereby be substantially fixed in vertical relationship to the base 23. In the depicted embodiment, the first and second parts 108, 110 are cylindrical in shape, with first and second central, vertical axes 112, 114, respectively, that, in the depicted embodiment, are substantially coincident. A substantially cylindrical outer surface 116 on the second part 110 is complementary to a cylindrical inner surface 118 on the first part 108, whereby the surfaces 116, 118 cooperate to guide relative movement between the first and second parts 108, 110 along their axes 112, 114. With this arrangement, the first and second parts 108, 110 can be placed in different axially overlapping relationships as an incident of the frame 52 moving vertically relative to the base 23. At the same time, the interacting guide surfaces 116, 118 confine relative horizontal movement between the first and second parts 108, 110. As a consequence, collectively, the surfaces 116, 118 effectively block relative horizontal movement between the frame 52 and base 23 through the spring assemblies 86.

A vertical biasing component 120 resides within a cylindrical space bounded by the second part 110 and acts between the frame 52, through the mounting frame parts 58, 60, and the platform assembly 84. In the depicted embodiment, the biasing component 120 is in the form of a coil spring. However, any component capable of exerting an adequate biasing force to support part or all of the weight of the frame 52 is contemplated.

By reason of providing multiple spring assemblies 86 in the arrangement shown, the spring assemblies 86 provide a primary support for the die assembly relative to the base 23 and may cooperatively stably support the die assembly 18 in a level horizontal orientation and allow the upstream and downstream ends of the die assembly frame 52 to be simultaneously raised and simultaneously lowered. The spring assemblies 86, however, do permit a modicum of vertical angular reorientation of the die assembly frame 52 that may be optimal to establish an exact, desired connection between the die assembly 18 and the conduit 28 and/or the conduit 28 and the upstream component cooperating therewith. The vertical angular change may be from end-to-end or side-to-side, or combinations thereof.

The linear bearings 88 and rails 92a, 92b make up another arrangement of components cooperating between the frame 52 and base 23 that allow controlled relative horizontal movement between the frame 52 and base 23, to thereby permit controlled alignment between the frame 52 and at least one of the polymer filter assembly 16 and processing assembly/roll assembly 22.

To achieve this end, it is possible that a single linear bearing 88 and rail 92a, 92b combination might be utilized. For stability and more positive guidance, a two rail arrangement with parallel rail lengths is preferred, with each of the rails and slots configured so that the rails and slots cooperate to guide the frame 52 relative to the base 23 in a substantially first linear path that is generally aligned with the line of the overall system flow path.

There is no requirement that either or both rails 92a, 92b be on the base 23. That is, the arrangement of the linear bearings 88 and rails 92a, 92b can be reversed. Alternatively, one rail 92a, 92b might be provided on the platform assembly 84 with the other rail 92a, 92b provided on the base 23 to cooperate with the linear bearings 88 in like fashion.

Within the generic showing of FIG. 2, and as an alternative to the slot and rail arrangement specifically described, the linear guiding of the frame 52 relative to the base 23 may be accomplished using other types of structures, to include captured cam followers, captured wheel arrangements, etc. One example of such an arrangement is shown in U.S. Pat. No. 8,021,140. Low friction, precision guided movement is a design objective, regardless of the particular construction.

Each of the side-to-side adjustment plates 100 is a part of a separate adjusting assembly through which the frame 52 can be shifted relative to the base 23 in a direction transversely to the linear flow path for the overall system 10. By shifting one or both of the loosened bearings 88 transversely to its length by turning the adjustment bolts 106, precise alignment of each rail 92a, 92b within its respective slot 90 can be effected. At the same time, the frame 52 is itself shifted relative to the base 23, which may be desirable to make and maintain a precise connection between the frame 52 and the polymer filter assembly 16 and/or processing assembly/roll assembly 23.

The aforementioned adjusting bolts and/or adjustable side plates 72a, 72 make up another adjusting assembly through which the vertical height and/or angular orientation of the rails 92a, 92b can be changed for proper component alignment and/or to facilitate more precise alignment between the rails 92a, 92b and slots 90 on the associated linear bearings 88.

Height adjustment bolts 122 are threaded through the platform assembly 84, extend through the biasing component 120 associated with each spring assembly 86, and into a blind bore 124 on the frame 52. Each bolt 122 has an unthreaded, reduced diameter end 126 projecting into the bore 124 on one of the mounting frame parts 58, 60. An annular shoulder 128 is defined to abut to the bottom surface 130 on the exemplary mounting frame part 58 in FIG. 7. The shoulder 128 blocks downward movement of the frame 52 relative to the base 23. By turning the bolt 122 in opposite directions around its length, the height of the shoulder 128 can be changed to allow selection of a plurality of different heights for the frame 52 at which it will be blocked in vertical movement relative to the base 23.

In this embodiment, the platform assembly 84 is in the form of a flat plate with a central plane P (FIG. 6) that is horizontally oriented. However, this is not a requirement.

With the inventive structure, as described above, a method of setting up an extruding system can be carried out as shown in flow diagram form in FIG. 8.

As shown at block 132, a die assembly is provided, as described above. As shown at block 134, a processing assembly is provided, as described above. As shown at block 136, a polymer filter is provided, as described above. As shown at block 138, the die assembly is operatively placed in relationship to each of the polymer filter and processing assembly/roll assembly so that: a) flowable material from the polymer filter assembly can be delivered to the processing assembly through the die assembly; and b) the die assembly frame can move relative to the polymer filter assembly through the support assembly to at least one of: i) allow manual alignment between the polymer filter assembly and the die assembly; and ii) accommodate thermal expansion and contraction of the die assembly and polymer filter assembly.

It is possible, with the above components, to control out of plane movement of the die assembly frame 52 in all but a direction parallel to the system flow path. Controlled vertical movement of the die assembly frame 52 is possible while limited vertical angular movement may also be permitted.

Design features permit precision alignment to occur and adjustments to be made to the position and orientation of the die assembly frame 52 to adjust for any misalignments that are observed by sliding the die assembly frame 52 unbolted from the polymer filter assembly 16, and observing the precision alignment of mating pilot and counterbores on mating surfaces. Thus, up/down, side-to-side, and tilt adjustments can be made to assure proper alignment.

The above construction potentially removes overhung loads from being transferred structurally to adjacent components while supporting the mass of at least the frame 52 via the spring assemblies 86 and allows for unrestricted thermal motion to occur as needed in the flow direction due to the machine operating temperature as metal components expand/contract.

As noted above, the invention contemplates different manners of mounting the die assembly 18, different configurations for the generically depicted conduit 28, and different interactions with upstream components that may be mounted in different manners relative to the base 23. Some of these variations are shown schematically in FIGS. 9-14 in which the same components are numbered the same and corresponding components that are modified are differentiated by a "'" designation on like numbers.

Figure 9:
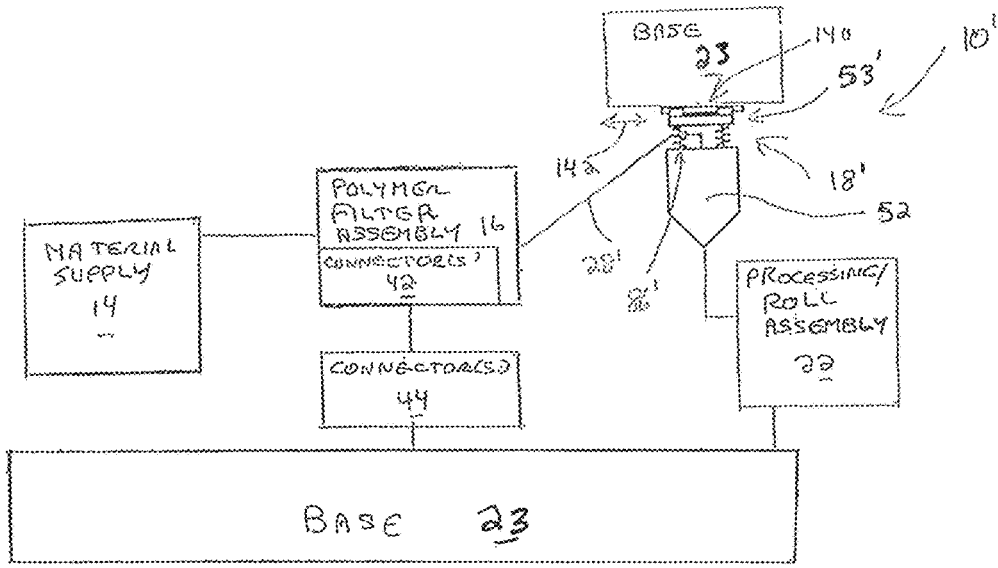
FIGS. 9-14 are schematic representations of extruding systems, according to the present invention, incorporating different support assemblies and supporting arrangements for the inventive die assembly frame, and with different forms of conduits for delivering polymer from a polymer filter assembly.

In FIG. 9, an extruding system is shown at 10' with the aforementioned polymer filter assembly 16 mounted to the base 23 through cooperating connectors 42, 44. A generic showing of the connectors 42, 44 in FIGS. 9-14 is intended to encompass all variations from fixed to multi-dimensional movement relative to the base 23. The polymer filter assembly 16 processes material from the supply 14.

In this embodiment, the die assembly 18' is configured to be mounted to an overhead portion of the base 23 to depend therefrom. The frame 52 is aligned to deliver the polymer in a downward direction to be applied to the appropriate location on the processing/roll assembly 22.

The support assembly 53' includes spring assemblies 86' that are placed in tension by the weight of the frame 52. The support assembly 53, in addition to the spring assemblies 86', incorporates a linear guide arrangement, shown generically at 140, that may utilize any of the cooperating components as described above to allow guided, translatory movement of the frame 52 in a line along the direction of the double-headed arrow 142.

For this embodiment, the conduit 28' has a gooseneck configuration through which polymer is delivered in an inclined path and then redirected to the frame at the downstream end of the conduit 28'.

Figure 10:
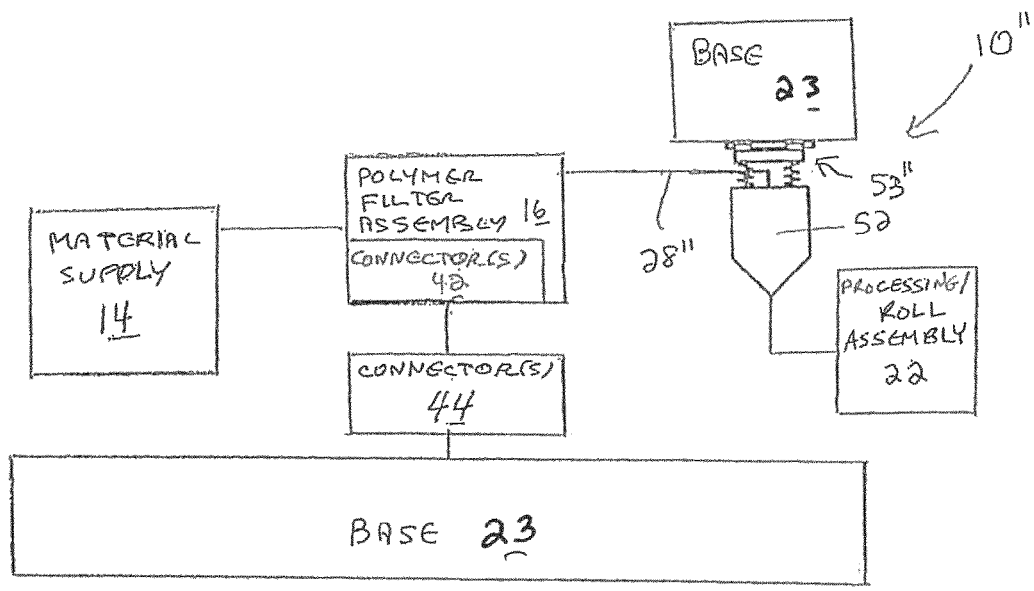

FIG. 10 shows a modified form of extruding system 10" that has a similar arrangement as in FIG. 9, with the primary difference that the conduit 28" defines a horizontal, linear flow path and does not have a gooseneck configuration. The frame 52 and support assembly 53", and all other components, are otherwise the same as shown in FIG. 9.

Figure 11:
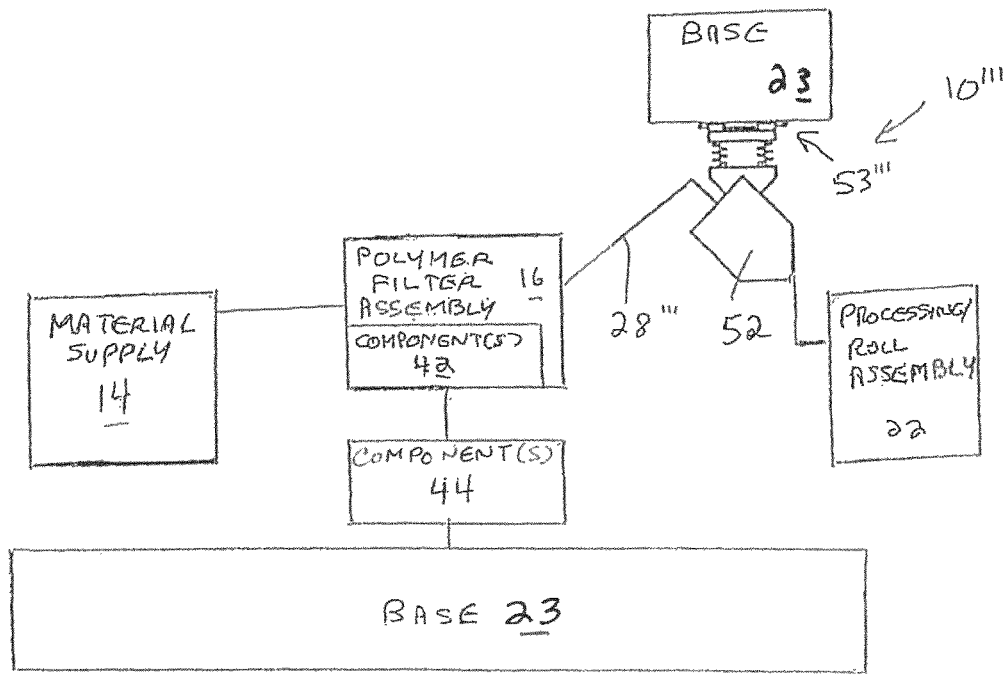

FIG. 11 shows a further modified form of extruding system 10'''. The primary difference in the FIG. 11 system configuration, compared to that in FIG. 10, is that the die assembly frame 52 has an angled delivery direction, with the conduit 28''' having a gooseneck configuration. The support assembly 53''' for the die assembly frame 52 is the same as shown in FIG. 10.

Figure 12:
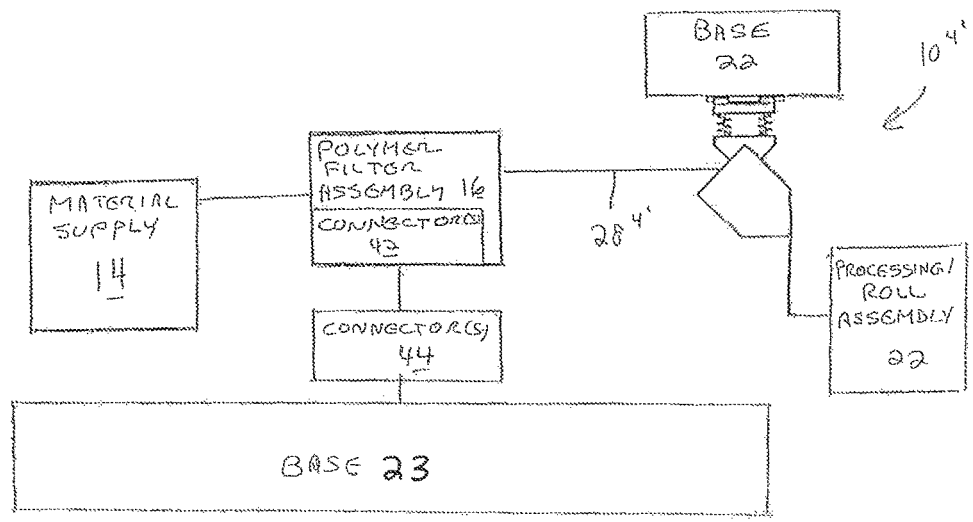

In FIG. 12, a further modified form of extruding system is shown at $10^{4'}$. The system $10^{4'}$ differs from the system 10''' only in that the conduit $28^{4'}$ has a non-gooseneck configuration.

Figure 13:
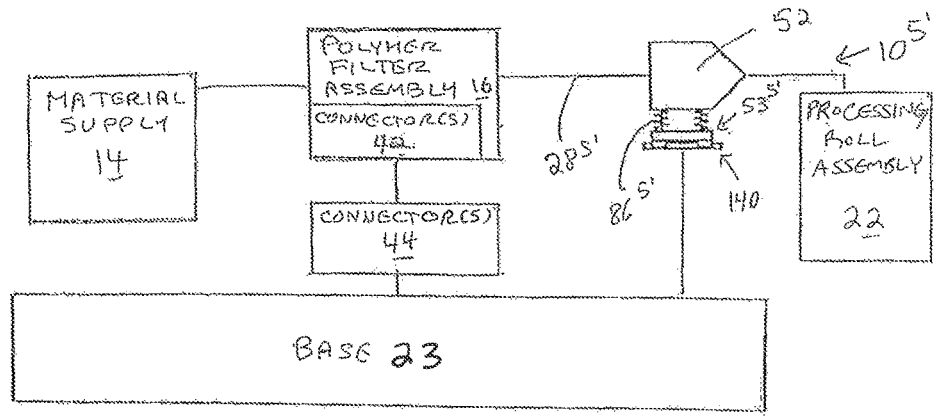

FIG. 13 shows a system $10^{5'}$ with the die support frame 52 supported from an underlying surface on the base 23 through the aforementioned support assembly $53^{5'}$, including spring assemblies $86^{5'}$ and the linear guide assembly 140. The conduit $28^{5'}$ has a non-gooseneck arrangement.

Figure 14:
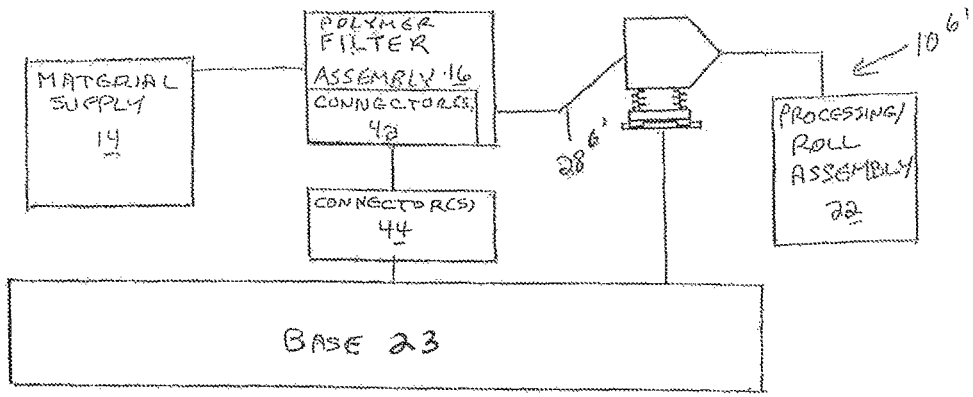

The extruding system $10^{6'}$ shown in FIG. 14 differs from the extruding system $10^{5'}$ in FIG. 13 by reason of the conduit $28^{6'}$ having a gooseneck configuration. All other components are the same as shown in FIG. 13.

The foregoing disclosure of specific embodiments is intended to be illustrative of the broad concepts comprehended by the invention.

The invention claimed is:

1. A die assembly through which flowable material from a supply is controllably delivered to a processing assembly at which a sheet layer is formed, the die assembly comprising:
   a main frame having upstream and downstream ends; and
   a support assembly for the main frame, the support assembly comprising:
   at least one component: a) cooperating between the main frame and a base by which base the main frame is supported; and b) configured to generate a vertical biasing force between the main frame and base such that the main frame is biasably supported by the vertical biasing force and the main frame, while being continuously biasably supported, can move upwardly and downwardly one of against or with assistance of the vertical biasing force relative to the base to thereby allow controlled relative vertical movement between the main frame and base so as to permit controlled alignment between the main frame and an upstream component that delivers flowable material from the supply to the die assembly,
   the main frame and support assembly configured so that the upstream and downstream ends of the main frame can be simultaneously raised and simultaneously lowered relative to the base one of against or with assistance of the vertical biasing force,
   the die assembly configured to deliver flowable material from the supply to the processing assembly to form the sheet layer.

2. The die assembly according to claim 1 wherein the at least one cooperating component comprises a plurality of spring assemblies that act between the main frame and base and cooperatively generate the vertical biasing force that is exerted upwardly upon the main frame, one of the plurality of spring assemblies spaced upstream of a second of the plurality of spring assemblies.

3. The die assembly according to claim 2 wherein at least one of the plurality of spring assemblies comprises a first part movable vertically with the main frame and a second part that is in substantially fixed vertical relationship to the base, the first and second parts configured to cooperate with each other to: a) guide vertical movement of the main frame relative to the base; and b) confine relative horizontal movement between the main frame and base.

4. The die assembly according to claim 3 wherein the first and second parts are cylindrical in shape respectively with first and second central vertical axes, the first and second parts aligned with the first and second axes substantially coincident and configured so that the first and second parts are movable vertically, each relative to the other, into different axially overlapping relationship as an incident of the main frame moving vertically relative to the base.

5. The die assembly according to claim 3 wherein the at least one spring assembly comprises a coil spring.

6. The die assembly according to claim 4 wherein the at least one cooperating component comprises a component on the at least one spring assembly that resides within a space bounded by one of the first and second parts and generates at least a part of the vertical biasing force.

7. The die assembly according to claim 1 wherein the die assembly has an inlet end and an outlet end spaced along a flow path for the flowable material, wherein the support assembly further comprises components cooperating between the main frame and base to allow controlled relative horizontal movement between the main frame and base to thereby permit controlled alignment between the main frame and an upstream component.

8. The die assembly according to claim 7 wherein the support assembly further comprises a platform assembly upon which the main frame bears and the cooperating components that allow controlled relative horizontal movement between the main frame and base comprise at least one rail on one of the platform assembly and base and a first slot on the other of the platform assembly and base, the one rail and first slot configured so that the one rail and first slot cooperate to guide movement of the main frame relative to the base in a substantially first linear path that is generally aligned with the flow path.

9. The die assembly according to claim 8 wherein the cooperating components that allow controlled relative horizontal movement between the main frame and base further comprise another rail and a second slot, the another rail and second slot provided one each on the platform assembly and base and configured so that the another rail and second slot cooperate to guide movement of the main frame relative to the base in a substantially second linear path that is substantially parallel to the first linear path.

10. The die assembly according to claim 8 wherein the at least one cooperating component comprises a plurality of spring assemblies that act between the platform assembly and main frame and cooperatively generate the vertical biasing force upon the main frame.

11. The die assembly according to claim 10 wherein the plurality of spring assemblies are configured and cooperate between the main frame and base to allow the main frame to be vertically angularly reoriented relative to the base.

12. The die assembly according to claim 10 wherein the die assembly further comprises an adjusting assembly through which the main frame can be shifted relative to the base in a direction transversely to the first linear path.

13. The die assembly according to claim 12 wherein through the adjusting assembly the main frame is shifted relative to the base in the direction transversely to the first linear path by changing a position of the one rail in the first slot in the direction transversely to the first linear path.

14. The die assembly according to claim 10 wherein the die assembly further comprises an adjusting assembly through which a vertical angular orientation of the one rail relative to the base is changed.

15. The die assembly according to claim 8 wherein the die assembly further comprises a height adjustment mechanism through which downward movement of the main frame relative to the base is blocked with the main frame at a plurality of different selectable heights relative to the base.

16. The die assembly according to claim 1 in combination with the upstream component and the main frame is guidingly movable relative to the upstream component through the support assembly through which flowable material can be delivered to the die assembly at the upstream end.

17. The die assembly according to claim 16 wherein the upstream component comprises a polymer filter assembly.

18. The die assembly according to claim 9 wherein the platform assembly comprises a flat plate with a central plane that is horizontally oriented and the one rail and first slot and another rail and second slot cooperate between the flat plate and the base.

19. The die assembly according to claim 1 wherein the at least one component cooperates between the main frame and a portion of the base that is above the main frame.

20. The die assembly according to claim 1 in combination with the processing assembly.

21. The die assembly according to claim 1 wherein the die assembly is configured with a horizontal delivery orientation.

22. The die assembly according to claim 1 wherein the die assembly is configured with a vertical delivery orientation.

23. The die assembly according to claim 1 wherein the die assembly is configured with an angled orientation.

24. A method of setting up an extruding system, the method comprising the steps of:
  providing a die assembly through which flowable material from a supply is controllably delivered to a processing assembly at which a sheet layer is formed, the die assembly comprising:
    a main frame having upstream and downstream ends; and
    a support assembly for the main frame, the support assembly comprising:
      at least one component: a) cooperating between the main frame and a base by which base the main frame is supported; and b) configured to generate a vertical biasing force between the main frame and base such that the main frame is biasably supported by the vertical biasing force and the main frame, and while being continuously biasably supported, can move upwardly and downwardly one of against or with assistance of the vertical biasing force relative to the base to thereby allow controlled relative vertical movement between the main frame and base so as to permit controlled alignment between the main frame and an upstream component that delivers flowable material from the supply to the die assembly;

the main frame and support assembly configured so that the upstream and downstream ends of the main frame can be simultaneously raised and simultaneously lowered relative to the base one of against or with assistance of the vertical biasing force;

the die assembly configured to deliver flowable material from the supply to the processing assembly to form the sheet layer;

wherein the die assembly is in combination with the upstream component, the upstream component comprising a polymer filter assembly; and wherein the main frame is guidingly movable relative to the upstream component through the support assembly through which flowable material can be delivered to the die assembly at the upstream end;

providing a processing assembly configured to form a sheet layer with the flowable material; and operatively placing the die assembly in relationship to each of the polymer filter assembly and processing assembly so that:
  a) flowable material from the polymer filter assembly can be delivered to the processing assembly through the die assembly; and
  b) the main frame can move relative to the polymer filter assembly through the support assembly to at least one of:
    i) allow manual alignment between the polymer filter assembly and the die assembly; and
    ii) accommodate thermal expansion and contraction of the die assembly and polymer filter assembly.

25. A die assembly through which flowable material from a supply is controllably delivered to a processing assembly at which a sheet layer is formed, the die assembly comprising:

a main frame having a mass; and a support assembly for the main frame, the support assembly comprising:

at least one component cooperating between the main frame and a base by which base the main frame is supported to allow controlled relative vertical movement between the main frame and base to thereby permit controlled alignment between the main frame and an upstream component that delivers flowable material from the supply to the die assembly, wherein the at least one component comprises a plurality of spring assemblies that act between the main frame and base and exert an upward biasing force upon the main frame, wherein the die assembly has an inlet end and an outlet end spaced along a flow path for the flowable material, wherein the support assembly further comprises components cooperating between the main frame and base to allow controlled relative horizontal movement between the main frame and base to thereby permit controlled alignment between the main frame and an upstream component, wherein the plurality of spring assemblies support an entire mass of the main frame relative to the base.

* * * * *